United States Patent [19]

Jones

[11] Patent Number: 5,170,820

[45] Date of Patent: Dec. 15, 1992

[54] MANAGEMENT SYSTEM FOR THE APPLICATION OF ANHYDROUS AMMONIA FERTILIZER

[75] Inventor: James S. Jones, Richardson, Tex.

[73] Assignee: David P. Ward, Dallas, Tex.

[21] Appl. No.: 695,544

[22] Filed: May 3, 1991

[51] Int. Cl.⁵ .................. A01G 25/09; B05B 9/06
[52] U.S. Cl. .................... 137/899; 137/486; 137/489.5; 137/561 A; 239/156
[58] Field of Search .................. 239/155, 156, 63; 137/485, 486, 487.5, 489.5, 899, 561 A

[56] References Cited

U.S. PATENT DOCUMENTS

| | | | |
|---|---|---|---|
| 3,782,634 | 1/1974 | Herman | 239/156 |
| 4,052,003 | 10/1977 | Steffen | 239/155 |
| 4,093,107 | 6/1978 | Allman et al. | 239/156 |
| 4,364,409 | 12/1982 | Jones | 137/486 |
| 4,530,463 | 7/1985 | Hiniker et al. | 239/155 |
| 4,657,568 | 4/1987 | Jones | 137/486 |
| 4,807,663 | 2/1989 | Jones | 137/561 A |
| 5,035,357 | 7/1991 | Brickell et al. | 137/489.5 |

FOREIGN PATENT DOCUMENTS

| | | | |
|---|---|---|---|
| 2827659 | 1/1979 | Fed. Rep. of Germany | 239/156 |
| 0884648 | 11/1981 | U.S.S.R. | 239/156 |

*Primary Examiner*—A. Michael Chambers
*Attorney, Agent, or Firm*—Daniel V. Thompson

[57] ABSTRACT

A system for controlling the flow of agricultural ammonia from a tank to applicator apparatus transported by a land vehicle over the ground includes a ground speed sensor that generates a speed signal representing the speed of the land vehicle over the ground, an ammonia flow reader that generates a flow rate signal representing the flow of ammonia through the system, a throttling device having means for varying the flow of ammonia through the system, and i)computing means for sending a throttling signal to the throttling device, the computing means being responsive to the speed signal and flow rate signal to cause the throttling device to throttle the flow of ammonia through the system.

14 Claims, 7 Drawing Sheets

MANAGEMENT SYSTEM FOR THE APPLICATION OF ANHYDROUS AMMONIA FERTILIZER

TECHNICAL FIELD

This invention relates to devices for controlling and dividing the flow of fluids, and more particularly relates to devices for metering and placement of anhydrous ammonia in agricultural fields for fertilizer.

BACKGROUND ART

Anhydrous ammonia is not only the nitrogen source for most synthetic fertilizers but also is commonly applied directly to the ground in its natural state for grain crops (corn, milo, wheat, etc.).

Ammonia is typically stored in a pressure vessel in its liquified gas phase, where it is a liquid due to its own vapor pressure. Heat flow into the system will be absorbed in the system by additional formation of vapor, increasing system pressure. Heat flow out of the system will produce condensation of vapor, reducing system pressure.

The application and distribution of ammonia for fertilizer is usually accomplished by a tractor equipped with a tool bar or cultivator. The ammonia is metered and placed into a plurality of spaced rows, 4 inches to 8 inches beneath the soil's surface, and the soil is sealed. Typically, a tractor tows an ammonia nurse tank wagon behind the tool bar, and suitable flexible connections are provided to transfer ammonia from the tank through a meter on the tool bar into a manifold, where flow is divided and fed into the soil through hoses and applicator knives.

The energy required to move ammonia through the system is supplied by its vapor pressure in the tank, however, ammonia moving from the tank to the meter experiences a pressure drop equal to the pressure head required to accelerate ammonia to its velocity through the system. This pressure drop requires a temperature reduction in the system which is provided by refrigeration or vaporization within the system. The colder the day, the lower the tank pressure, and the greater the distance from the tank to the meter—the greater the percentage of vapor in the system prior to metering. Vapor in the system prior to metering degrades the accuracy of the metering function. Operations using larger, more powerful tractors available today, capable of pulling wider tool bars at greater speeds across fields, have often outrun capacities of control systems during late fall and early spring cold weather applications. This condition prevails not only with tool bar-mounted mechanical meters but also electrically-controlled meters due to unknown system resistance from the nurse tank to the tool bar mounted meter. See U.S. Pat. No. 4,364,409, Dec. 21, 1982, Fluid Flow Control Device, James S. Jones, the disclosure of which is incorporated herein by reference.

Thus, as ammonia is fed through the application system by its own vapor pressure, it experiences an ever changing set of conditions as it moves through the system. A system at rest (no product moving in or out) has a thermal balance; the thermal energy in equals the thermal energy out. On demand of product the product moves up the dip tube forming an efflux at the entrance of the dip tube. This acceleration requires a drop in temperature reflected by the dew point of the product at the tank pressure and the dew point of the product that has been accelerated a the entrance of the dip tube. This drop in temperature is provided by the formation of vapor within the system. This reaction is repeated at every restriction as the product moves through the system—the withdrawal valve, the hose end valve (or reader), the safety coupling, the shut-off valve, the meter (or throttle), the manifold outlet fittings and the discharge tube on the knives. Unlike a true liquid system where the points of restrictions can be considered orifices in series and where one value can be established for all of the points of restrictions, an ammonia system must deal with each restriction individually.

It is known to utilize vapor stripping prior to metering, which works very well in the mid-upper range of application. The gray area is in the low range of applications where stripping dumps first open. Over-stripping may occur, which reduces the system's dew point by refrigeration, and ammonia across the metering point behaves like a liquid rather than a liquified gas resulting in over-application at lower application rates on small grains using narrow tool bars. See U.S. Pat. No. 4,657,568 Apparatus For Volumetrically Controlling The Flow Of A Gas And Liquid Mixture, James S. Jones, the disclosure of which is incorporated herein by reference.

Prior apparatus for dividing flow has been acceptable for high outputs required for larger grains, grown usually in 30 inch rows and requiring 200 pounds N or more per acre; however, uneven distribution is not uncommon with small grains with larger tool bars on the rolling hills often found in wheat country. A 45 foot tool bar used for corn, with 30 inch rows having 18 knives applying 200 pounds N per acre, is a much simpler distribution problem than the same tool bar used for wheat, with 12 inch rows, 45 knives, and 75 pounds N per acre. A two manifold system has been used with corn with limited success; however, in wheat, two manifolds with the present systems becomes a disaster. The best present art is a controlled manifold. See U.S. Pat. No. 4,807,663, David Ward and James S. Jones, Feb. 28, 1989, the disclosure of which is incorporated herein by reference.

In an effort to even out the pressure difference across each row a constant hose length for each row is typically used. So, with a 45 foot tool bar in corn, in excess of 400 feet of applicator hose is required; with wheat, in excess of 1,000 feet is required.

A fairly common problem in applying ammonia is the finishing off of a field with a strip less wide than the width of the tool bar. For example, a farmer may apply an entire field in 40 foot wide strips with a 40 foot wide tool bar, but end up with a 30 foot wide remainder. Presently, his only choices would be to leave the remainder untreated or to overtreat a 10 foot strip.

SUMMARY OF THE INVENTION

This invention includes hardware that interfaces with existing microprocessors or on-board computers of farm vehicles to provide a system for management of metering and distribution of liquid ammonia used as fertilizer. The position of a butterfly disc is read at the outlet of the nurse tank to determine the quantity of product flowing. A throttling device, mounted on the tool bar, is positioned electronically to match the requirement signal from a microprocessor or computer with the signal from butterfly disc reader to provide and control the total product flow. Non-electrical means divides total product either through a manifold having an outlet for each row or into two, three, four, or more streams to feed manifolds for sections of the tool bar.

Thus, the improved management system is actuated by demand signals received from a computer on-board the tractor pulling the system. These demand signals vary directly with the speed of the rig. The novel components of the system include a throttling device immediately upstream from one or more distribution manifolds and an ammonia flow reader immediately downstream from the ammonia tank. The throttling device is controlled electronically by comparing the demand signals from the computer with signals received from the ammonia flow reader.

The formation of vapor downstream of the flow rate read has been found to affect only maximum capacity of the system and not the accuracy of the reader. Thus, flow rate is read as close to the source as practical, between the nurse tank's withdrawal valve and the supply hose to the tool bar, with the throttle located on the tool bar, leaving only the variables between the bottom end of the dip tube and the outlet of the withdrawal valve that will affect the first dimension control (pounds product over acres).

The reader butterfly disc is unbalanced to the open position by an offset butterfly shaft and a pressure difference across will open and keep it in contact with the stop pin. Through one end of the butterfly shaft is a position pick-up pin that is perpendicular to the butterfly, whose position is read electronically across a sealing plate of proper material. Attached to the upper end of the stop pin is a diaphragm with a closing spring above it. The bottom side of the diaphragm has communication with the product upstream of the butterfly. The top side of the diaphragm also has communication with the product downstream of the butterfly but across a pressure differential control having a diaphragm which reads the upstream pressure on its bottom side and the downstream pressure on its top side. Upon product demand, a pressure drop occurs downstream of the butterfly. When this pressure drop reaches the control point, the control diaphragm moves up against the control spring and opens a small valve that throttles the product across the top side of the larger diaphragm to position the stop pin against the closing spring. The small diaphragm reads the pressure difference across the butterfly and positions the stop pin to provide a constant pressure difference regardless of product demand. The quantity of product is determined by the computer and electronically positions the throttling device which is mounted on the tool bar. The outlet of the reader is provided with a manually operated ball valve which is to be opened only when the reader is attached to the withdrawal valve.

The product leaves the flow rate reader through a hose over to the tool bar and flows through a safety coupling through a short hose through a hydraulic ball valve into the throttling device.

The throttling device receives product from the bottom into a round bore where it meets the throttling piston which is normally closed. Upon demand for product, a duty cycle solenoid receives the proper throttling signal from the computer and allows a flow of product across a restricting orifice providing the pressure difference across the throttle diaphragm to open and position the throttling piston for the proper area to supply the product demand. The duty cycle solenoid pulses off and on about ten times per second with a varying on/off ratio. This throttles the flow of the pilot charge to position the throttle. When the flow is greater across the solenoid than the orifice, the throttle is opening. When the flow is equal across the orifice and solenoid, the throttle remains fixed. To enhance the operation of the duty cycle solenoid, a pressure differential limit valve is placed at the discharge side and limits the pressure differential to 15-20 PSI as the pilot charge moves to the waste outlet on its way to one of the applicator knives where it is placed in the soil.

The arrangement of the pilot charge pick up encourages the removal of vapor from the system, which vapor is due to the filter and screen bed and the difference in velocities from the entrance and the restricting orifice. A magnet is placed downstream of the orifice to strip and retain iron oxide from the pilot charge to prevent contamination of the solenoid.

The flow divider divides the flow into three or four streams. The product requirement for each stream may not be equal. A 50 foot tool bar having 50 knives would require: one-fourth of 50 equals 12.5, one-third of 50 equals 16.66. With four divisions, two manifolds would require 13 outlets and two manifolds would require 12 outlets, and with three divisions two manifolds would require 17 outlets and one manifold would require 16 outlets. A thirty-six foot tool bar with four streams would require four manifolds with 9 outlets and three streams would require three manifolds with 12 outlets. The pressure difference across the dividing ports is controlled independently and is not affected by upstream or downstream pressures; therefore, the systems can be tailored to accommodate the different requirements by altering the pressure differentials. For example, in a rig requiring two manifolds with 12 outlets and two manifolds with 13 outlets, a base pressure differential of 9.0 PSI could be used with the 12 outlet manifolds while the 13 outlet manifolds would require $(13/12)^2 \times 9.0$ or a pressure differential of 10.6 PSI. This would be accomplished by providing a spacer under the control spring of two of the differential pressure controls.

The total product flowing as controlled by the computer and read by the butterfly position enters the divider port area where the flow is divided across the ports, then throttled independently to the proper pressure differential to supply each stream with the proper product. The divider valve is nylon with a bullet shaped nose that is received by a cone-like seat and is throttled by the pressure difference across a diaphragm that is positioned by a flow of product, taken upstream of the divider ports, and throttled from the control diaphragm chamber to the pressure chamber, where is acts on the divider diaphragm to position the divider throttle, then flows across a restricting orifice to the outlet. The spring side of the control diaphragm has communication with the area between the dividing port and the throttle valve, allowing the control diaphragm to read and control the pressure difference across the port.

As an optional feature, the pressure differential controls may be fitted with a solenoid in the pilot discharge leg. When the solenoid is closed, the upstream pressure acts on the throttle diaphragm to close the throttle valve. While this valve is not intended to serve as the system's shutdown valve, it will do an excellent job of shutting down tool bar sections to finish out fields or can be used for shutdown for the turnaround.

A compact manifold is used with the system having different diameter outlet rings to accommodate the different outlet requirements placing the orifices for the outlets as close to one another as practical.

This system of management of the product across the tool bar is very dependable and accurate and eliminates the need of extremely long applicator hoses which pick up a lot of uneven heat flow, which increase the back pressure of the hoses with the greater heat input and affects the distribution, especially on the lower outputs required by the small grains.

The biggest pressure drop of this system occurs either (1) just after product has been divided to feed separate sections of the tool bar, or alternatively, (2) just before the product enters a controlled manifold which feeds the entire tool bar. This pressure drop at the system's throttling device is controlled electronically to match a demand signal from the on-board computer with the ammonia flow reader which is at the inlet end of the system.

In the ammonia flow reader, the position of a butterfly valve having a constant pressure head across it determines the quantity of product. The butterfly valve is located as near the tank's withdrawal valve as practical to provide it with the product having experienced the least physical change due to the thermodynamic properties of ammonia. This method of reading the flow of a liquified gas has less error than a method that attempts to read volume, such as a turbine or paddle-wheel flow meter.

DETAILED DESCRIPTION

Figure 1:
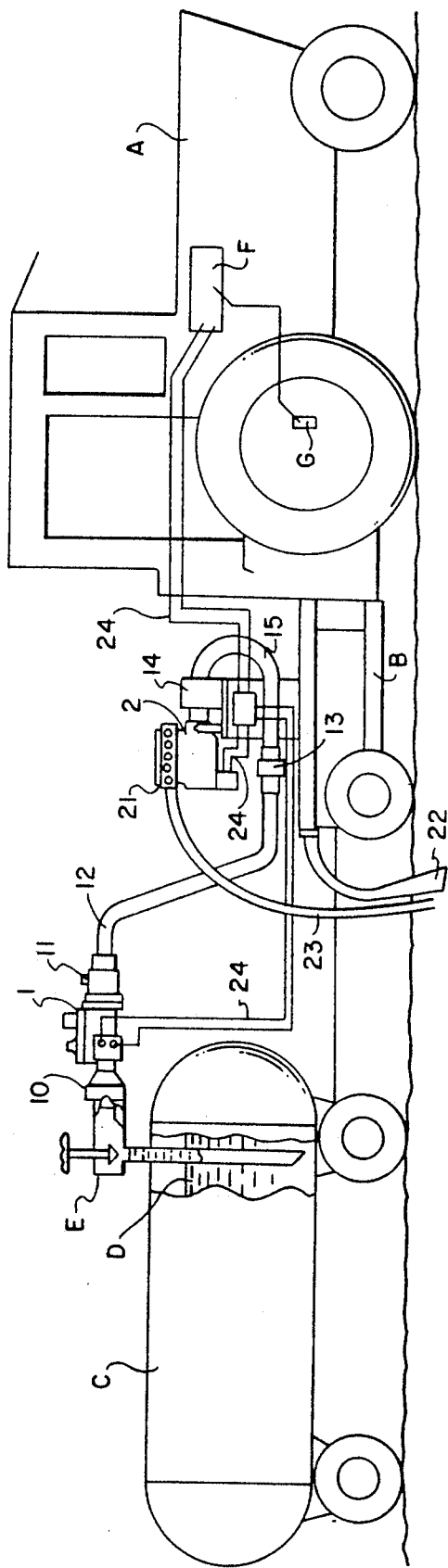
FIG. 1 is a partially broken-away, schematic view of an embodiment of the system of the present invention mounted on a rig ready for applying fertilizer.

Referring initially to FIG. 1, tractor A has a tool bar B attached, with nurse tank C in tow. Liquid ammonia D inside the tank C is expelled by way of liquid withdrawal valve/dip tube outlet E when required by the system.

The flow control components of the system are ammonia flow reader 1 and throttling device 2. Ammonia flow reader 1 is mounted on valve/dip tube outlet E by an acme coupling 10. A ball valve 11 is connected to the output of ammonia flow reader 1. A flexible feeder hose 12 connects ball valve 11 to throttling device 2 by way of safety coupling 13, hydraulically-actuated ball valve 14, and hose 15.

Throttling device 2 is mounted at the outlet of ball valve 14. Manifold ring 21 at the outlet of the throttling device 2 has the proper number of outlets to match the multiple applicator knives 22 with the proper hoses 23 between ring 21 and knives 22. For clarity, only one knife 22 and hose 23 are shown in FIG. 1.

Tractor A is equipped with an on-board computer F and has a sensor G to determine ground speed. Reader 1 and throttling device 2 are interconnected with computer F by way of cables 24.

The factors required to meter ammonia are:
1. a variable factor, ammonia flow per unit time, measured by ammonia flow reader 1;
2. row width, a constant;
3. number of rows, a constant;
4. desired pounds N per acre, a constant; and
5. the variable ground speed measured by speed sensor G.

The demand signal at a given instant represents the constants multiplied times the measured ground speed. Computer F positions throttling device 2 to match the demand signal at any instant with a given flow signal from ammonia reader 1.

Figure 2:
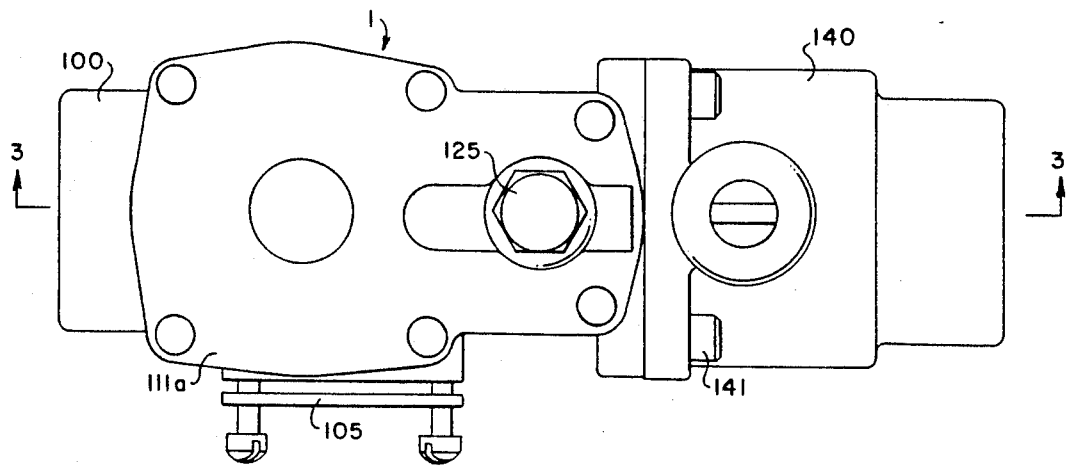
FIG. 2 is an overhead view of an ammonia flow reader used in the system of FIG. 1.
Figure 3:
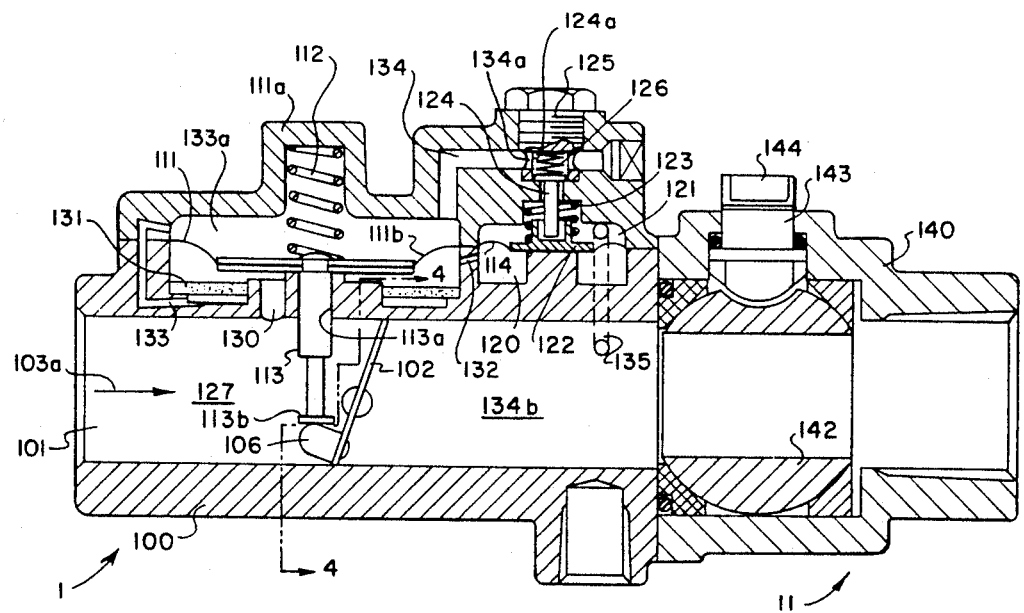
FIG. 3 is a sectional view taken along line 3—3 of FIG. 2.
Figure 4:
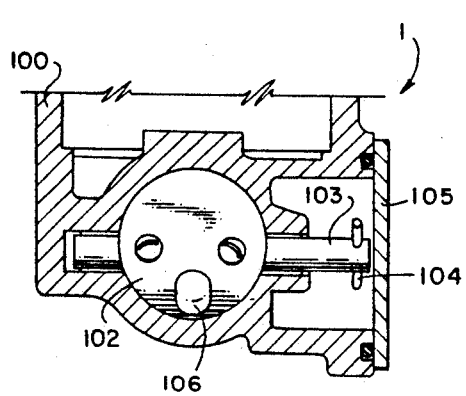
FIG. 4 is a partial sectional shown taken along line 4—4 of FIG. 3.

Referring now to FIGS. 2-4, ammonia flow reader 1 includes main body 100 with an inlet bore 101 and a butterfly disc 102 mounted on shaft 103. Butterfly disc 102 is positioned on shaft 103 off-center of inlet bore 101 to unbalance its opening in the direction of normal flow indicated by arrow 103a. Shaft 103 carries a steel pin 104 that co-rotates with shaft 103. The position of steel pin 104 is read electronically, by a known technique, through a non-ferrous plate 105, eliminating the need of a pressure seal.

A diaphragm 111 is secured between the faces of diaphragm cover 111a and body 100. A main portion 111b of diaphragm 111 is spring-loaded in the direction of bore 101 by spring 112. A cylindrical pin 113 is connected to main portion 111b opposite spring 112, and is constrained for coaxial movements perpendicular to bore 101 by walls 113a. Pin 113 positions the opening of butterfly disc 102, by head 113b of pin 113 slidably acting on curved post 106 fixed to butterfly disc 102.

A control portion 114 of diaphragm 111 separates control chambers 120 and 121 of body 100 and cover 111a, respectively. A diaphragm disc 122 contacts control portion 114 on one side and is loaded by spring 123 on the other side. A rivet-like control valve 124 is constrained for coaxial movements by a cylindrical bore 124a within plug 125 and is biased to a closed position by spring 126 contained within bore 124a.

Communication between upstream bore 127 and the control area is through opening 130, across filter 131, and through orifice 132 to control chamber 120, thus providing the upstream pressure to the lower side of control portion 114. Communication between upstream bore 127 and control valve 124 is provided through restricting passage 133 into an upper diaphragm chamber 133a formed in cover 111a, through passage 134 and through passage 134a drilled in plug 125. The downstream communication from downstream bore 134b to control chamber 121 is through passage 135.

Ball valve 11 includes ball valve housing 140 is attached to body 100 by four screws 141 (FIG. 2), and houses ball valve 142 which is shown in its open position. Ball valve 142 has a stem 143 which terminates at a tongue 144, such that an unattached wrench, for safety reasons, is required to open and close the valve.

In operation, when the system is ready to apply ammonia, tank valve outlet E is full open, ball valve 11 is open, the ball valve 14 is closed and the system master switch is on. The operator puts his rig in motion, opens valve 14 and drops his tool bar B so the knives 22 enter the soil to the proper depth. Throttling device 2 will receive a signal from computer F when the rig is put in motion and will open to allow the movement of ammonia through the system. Butterfly disc 102 and control valve 124 are both closed until there is demand.

A constant pressure difference between upstream bore 127 and downstream bore 134a will be maintained by the positioning of butterfly disc 102. This preset pressure difference, preferably in the range of about 1 to about 8 p.s.i., is established by the area of the control portion 114 of diaphragm 111 divided by the force of spring 123. Upon demand, product is moved out of downstream bore 134b, resulting in a pressure drop in control chamber 121, allowing the pressure difference across control portion 114 of diaphragm 111 to overcome spring 123 and open control valve 124, evacuating the upper diaphragm chamber 133a, allowing diaphragm main portion 111b to overcome spring 112, lifting pin 113 away from post 106, and allowing the unbalanced butterfly disc 102 to follow. Should the pressure difference across butterfly disc 102 exceed the preset amount, the opening of valve 124 will increase, further lowering the pressure above diaphragm main portion 111b and allowing the opening of butterfly disc 102 to increase, thereby lowering the pressure difference to the preset value. Should the pressure difference across the butterfly disc 102 go below the preset value, the opening across control valve 124 would be reduced, allowing the spring 112 acting on diaphragm main portion 111b to reduce the opening of butterfly disc 102, thereby increasing the pressure difference.

The open area across the butterfly disc required to maintain the preset pressure difference is determined by the velocity of ammonia across the open area, with its velocity being related to the pressure difference. Therefore, the accuracy of the pressure difference and the reading of the butterfly position determines the accuracy of the read.

The required open areas across the butterfly disc may be determined as follows:

Typically, nurse tank dip tubes have a rather large diameter of about 1.6". This provides a relatively small change in the system—at 50° F. and 75 PSIG an output 10,000 pounds of ammonia per hour would require efflux pressure drop of 0.2 PSI, a temperature of 0.12° F., producing 0.01268 pounds of vapor per 39 pounds of liquid product which would require 0.041595 cubic feet, reducing the weight of one cubic foot of product from 39 pounds to 37.454 pounds.

Therefore, to simplify a rather complex system it may be analyzed using isothermal conditions. The liquid head required to lift the product from the liquid level in the tank to the withdrawal valve has a much greater effect on the system than the efflux.

Disregarding the efflux, the effect of a specific liquid head becomes constant for any product demand. Table 1 shows the effect of different liquid levels of a system having a temperature of 50° F. and 75 PSIG pressure with a weight of 39 pounds per cubic foot and a value of 14,998 pounds of product per hour without lift. In Table 1:

TABLE 1

| | | |
|---|---|---|
| Lift = | Pounds per square inch | |
| $\Delta T$ = | Required temperature change (0.6 degrees per 1.0 PSI change) | |
| BTU = | Required BTU to change the temperature of 39 pounds required by $\Delta T$ (0.7 per pound per 1.0 $\Delta T$) | |
| Lbs. Vapor = | Pounds product vaporized per 39 pounds of product as required by $\Delta T$ ($\Delta T/0.7 \times 39 \times 1/527$) | |
| CF-P39 = | Cubic feet of system for 39 pounds of product | |
| Lbs. CF = | Pounds of produt per cubic foot of system (vapor weight .305 pounds per cubic foot) | |
| Lbs. Hr = | Pounds product per hour based on the acceleration due to gravity at 1.0 PSI liquid head and 1.0 square inch opening | |

| Tank Content | Lift | $\Delta T$ | BTU | Lbs. Vapor | CF Vapor | CF-P39 | Lbs. CF | Lbs. Hr |
|---|---|---|---|---|---|---|---|---|
| Full | 0.316 | 0.237 | 13.204 | .0251 | 0.0823 | 1.0817 | 36.0544 | 14,412 |
| ¾ Full | 0.496 | 0.345 | 19.221 | .0365 | 0.1197 | 1.1188 | 34.8588 | 14,171 |
| ½ Full | 0.632 | 0.426 | 23.734 | .0451 | 0.1479 | 1.1467 | 94.0106 | 13,997 |
| ¼ Full | 0.813 | 0.535 | 29.807 | .0566 | 0.1856 | 1.1841 | 32.9364 | 13,775 |
| Empty | 0.991 | 0.642 | 35.769 | .0680 | 0.2230 | 1.2213 | 31.9332 | 13,565 |

The typical withdrawal valve has an excess flow check valve with a through bore of about 0.94 Inches, which has an efficiency of about 0.65, giving an area of 0.45 square inches. The effect on the product as it moves from the tank across the dip tube and the withdrawal valve at five different product demands is shown below in Table 2, with 50% of product in the nurse tank at a temperature of 50° F. Table 2 shows the weight change per cubic foot of product due to the required pressure head to lift the product and the efflux of the dip tube, where:

TABLE 2

| | |
|---|---|
| Ef + Lift = | Is at the entrance of the dip tube (shown in PSI + .426 head) |
| Lbs. CF = | Weight per cubic foot of product just prior to entering the withdrawal valve |

TABLE 2-continued

Lbs. Hr = Pounds product at 1.0 PSI head and 1.0 square inch based on acceleration due to gravity
Valve Value = Lbs. Hr × the area of the withdrawal valve
ΔP = Pressure across the withdrawal valve
ΔT = Temperature across the withdrawal valve
BTU = BTU for one cubic foot of product
Lbs. Vapor = Lbs. vapor produced across the withdrawal valve
CF Vapor = Cubic feet vapor produced across the withdrawal valve
Weight = Weight per cubic foot product at exit of withdrawal valve
Product Hr = Pounds of product per hour based on acceleration due to gravity with 1.0 ΔP (PSI) and 1.0 square inch at the withdrawal valve discharge

| Lbs. Product Hr | EF + Lift | Lbs CF | Lbs. Hr | Valve Value | ΔP |
|---|---|---|---|---|---|
| 2,000 | .2604 | 37.9812 | 14,790 | 6672 | .0899 |
| 4,000 | .2748 | 35.6322 | 14,326 | 6463 | .3831 |
| 6,000 | .2988 | 35.3658 | 14,273 | 6439 | .8683 |
| 8,000 | .3324 | 34.9990 | 14,198 | 6405 | 1.5601 |
| 10,000 | .3756 | 34.5385 | 14,105 | 6363 | 2.4702 |

| Lbs. Product Hr | ΔT | BTU | Lbs. Vapor | CF Vapor | Weight | Product Hr |
|---|---|---|---|---|---|---|
| 2,000 | .05390° | 2.92542 | .00554 | .01817 | 37.3090 | 14,659 |
| 4,000 | .22990° | 11.70060 | .02220 | .01279 | 33.2338 | 13,836 |
| 6,000 | .52098° | 26.32125 | .04490 | .16340 | 30.4344 | 13,240 |
| 8,000 | .93606° | 46.80200 | .08864 | .29060 | 27.1713 | 12,510 |
| 10,000 | 1.48212° | 73.12900 | .13824 | .47181 | 23.5307 | 11,642 |

Table 3 shows the required butterfly disc area in square inches. The effective area with the degrees of butterfly representing the area is shown The butterfly disc preferably is closed at 20°, with a 30° positioning yielding 12% of the maximum area. However, a smaller angle of closure may be desirable to accommodate the low product demand when finishing off fields of small grains. In such situation, an angle of closure of 5° with a 15° opening yielding 4.6% of maximum open area is preferred.

TABLE 3

| | REQUIRED AREA ACROSS BUTTERFLY | | | |
|---|---|---|---|---|
| Lbs Product Hr | At 5.0 PSI ΔP | Deg. Butterfly | At 8.0 PSI ΔP | Deg. Butterfly |
| 2,000 | .0610 sq. in. | 28°+ | .0482 sq. in. | 20°+ |
| 4,000 | .1293 sq. in. | 36°+ | .1022 sq. in. | 31°+ |
| 6,000 | .2027 sq. in. | 42°+ | .1602 sq. in. | 38°+ |
| 8,000 | .2860 sq. in. | 49°+ | .2261 sq. in. | 44°+ |
| 10,000 | .3842 sq. in. | 55°+ | .3037 sq. in. | 49°+ |

In operation, the condition of the product approaching the butterfly disc varies from liquid stream flow along the bottom of the butterfly bore with the vapor moving above it, to a system with vapor bubbles entrapped in the liquid, to a super saturated vapor. Should the liquid stream and vapor stream remain separated across the butterfly the vapor velocity at 5.0 PSI ΔP would be 389 feet per second while the liquid velocity at 5.0 PSI ΔP would be 34.4 feet per second, in a system where the liquid and vapor are well blended with vapor bubbles entrapped in liquid, with a weight of 32 pounds per cubic foot, the velocity at 5.0 PSI ΔP would be 37.95 feet per second, and a cubic foot of product weight 25 pounds would have a velocity of 42.93 at 5.0 PSI ΔP. Should product at three different conditions be moved across an opening of 0.30 square inches, the results would be: the stream flow the a product weight of 32 pounds per cubic foot would be 10,119.56 lbs. hr. while a blended product of the same weight would be 9,107.06 lbs. and a blended product with a weight of 25 lbs. would be 8,050.0 lbs.

The conditions of the product approaching a metering point can vary from the stream flow to liquid with entrapped vapor bubbles, to super saturated vapor. With the metering point just downstream from the withdrawal valve, a super saturated vapor condition would not exist under normal operating conditions, however there will be short periods that it will exist (very high outputs, cold days, nurse tank approaching empty).

Integral Throttle and Controlled Manifold

Figure 5:
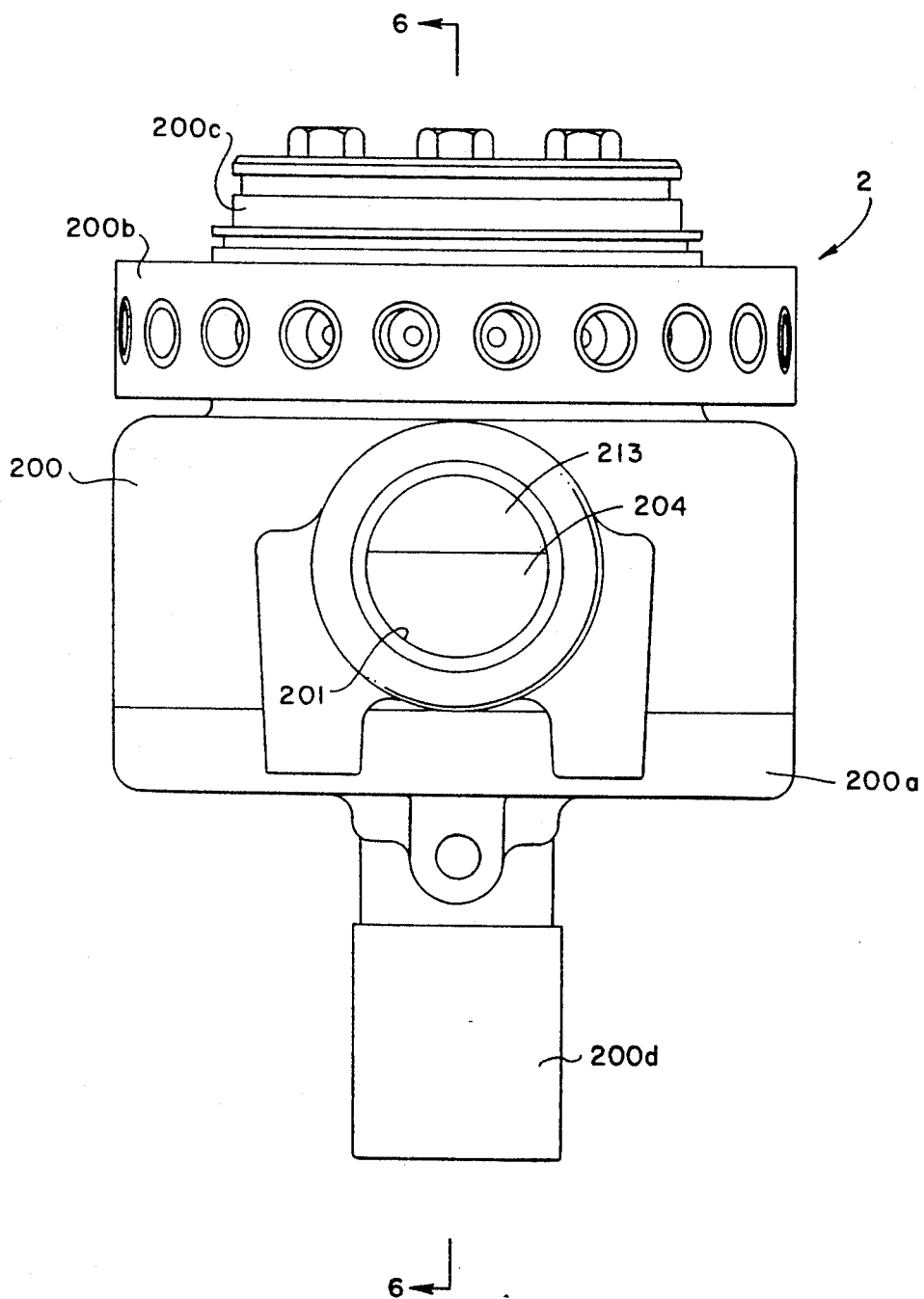
FIG. 5 is a an end view of a first embodiment of a throttling device for use with an integral controlled manifold.
Figure 6:
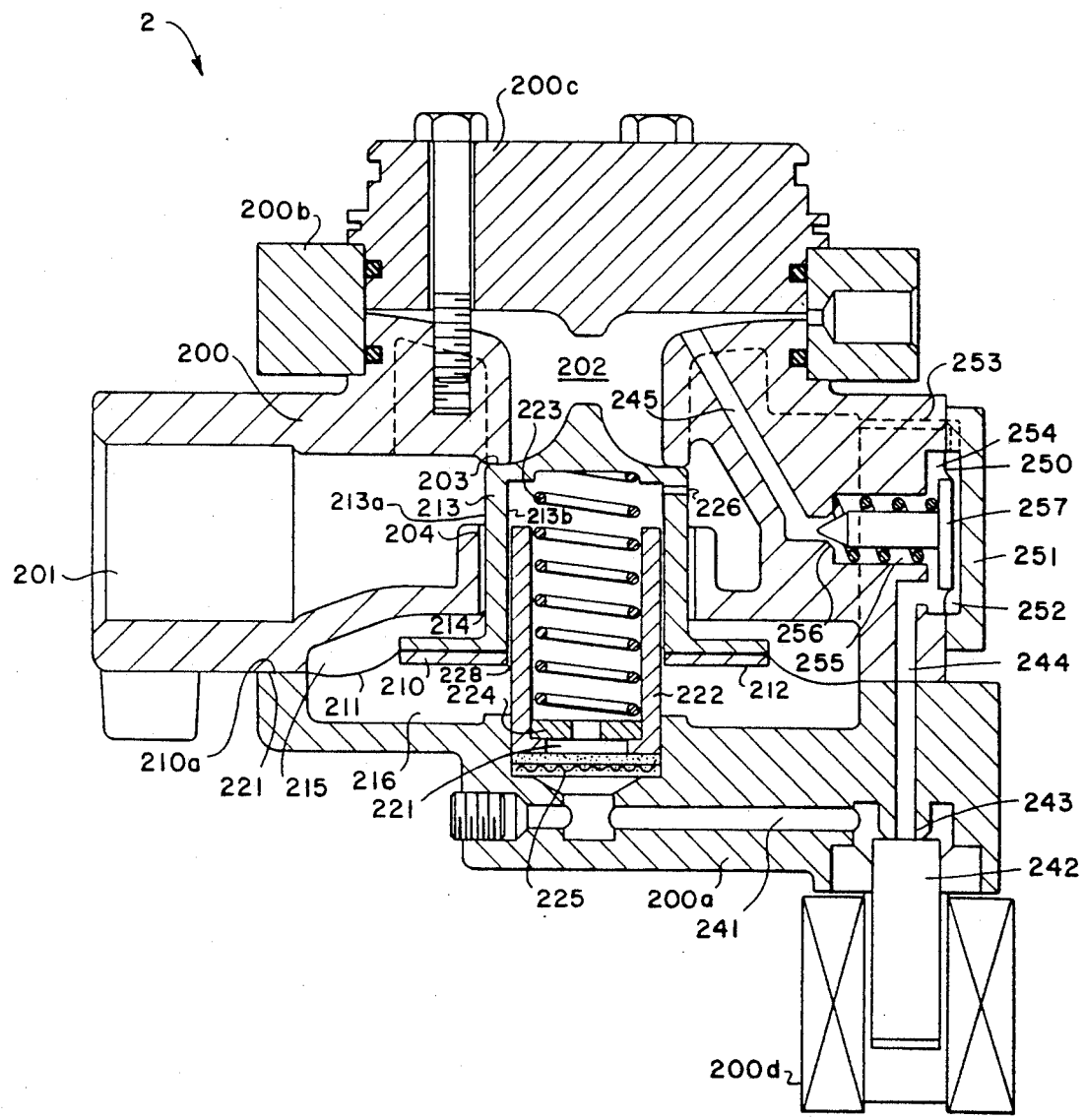
FIG. 6 is a sectional view taken along line 6—6 of FIG. 5.

Referring now to FIGS. 5 and 6, a first embodiment of a throttling device 2 includes a body 200, a diaphragm cover 200a, an integral manifold ring 200b, manifold bonnet 200c and a duty cycle solenoid 200d. Body 200 has an inlet 201 and an outlet 202, with a valve seat 203 located between inlet 201 and outlet 202. A cylindrical valve guide 204 is located opposite valve seat 203. Diaphragm and valve assembly 210 is secured between diaphragm faces 210a and 221. Diaphragm and valve assembly 210 is made up of diaphragm 211, disc 212, and a tubular main valve 213. Valve 213 has an outer surface 213a and an inner surface 213b on opposite sides of diaphragm 211. Outer surface 213a of valve 213 and valve guide 204 are sized to allow communication through an annular gap 214 between inlet 201 and upper control chamber 215. Diaphragm 211 forms a lower control chamber 216 with cover 200a. Cavity 221 in cover 200a has a common center line with valve guide 204. A cup-like interguide 222 is fixed in cavity 221, and interguide 222 houses closing spring 223 and washer magnet 224 (which collects iron oxide to prevent accumulation in the solenoid). Interguide 222 traps a filter 225 in cavity 221. Resisting orifice 1226 between outer surface 213a and inner surface 213b allows communication between the inlet 201 and the interior of interguide 222 and lower control chamber 216 by way of annular gap 228.

On the discharge side of the duty cycle solenoid 200d is a device that limits the maximum pressure difference across the solenoid, increasing the service life of the valve seat. The limiting device has a diaphragm 250 retained by a cover 251 that forms a system pressure chamber 252 that has communication with the inlet 201 through passage 253. There is a cavity 254 having a center bore 255 that has a valve seat 256 in its bottom which is throttled by valve 257. Valve 257, biased by spring 258, contacts diaphragm 250.

In operation, when the rig is ready to apply ammonia, with the ball valve 14 (FIG. 1) closed, there will be little liquid ammonia in the throttling device 2, valve 213 will be against its seat 203, and the maximum pressure valve will be opened by spring 258. However, when the rig is set in motion, the duty cycle solenoid 200d starts to receive electrical pulses which bring about a flow of product across resisting orifice 226 in piston 213, across magnet 224, through filter 225, through passage 241 across solenoid valve 242 and seat 243 into chamber 254 through passage 244, where it is throttled at seat 256 by valve 257 prior to entering passage 245 and outlet 202.

When product flow across restricting orifice 226 is equal to the product flow across the solenoid, the throttle remains in a fixed position. When the flow across the solenoid is greater than the flow across the orifice, the valve opening is increased, and when the flow across the orifice is greater than the solenoid, the valve opening is decreased.

Thus, the rate of product flow to manifold ring 200b is controlled by the on/off widths of a square wave throttling signal applied to solenoid 200d by computer F, in response to the flow rate signal received from ammonia flow reader 1, to control the product quantity over time. The system is speed sensitive, so a given product quantity over area is established and controlled. The movement of product from outlet 202 through manifold ring 200b on into the soil is disclosed in my U.S. Pat. No. 4,807,663, incorporated herein by reference.

The duty cycle solenoid positions the throttling valve to allow the proper product flow, limited only by the pressure within the tank to move the product through the system. This device is failure-tolerant, in that loss of the electrical circuit to the solenoid results in shut-down of the system.

Flow Dividing Throttling Device and Remote Manifold

Figure 7:
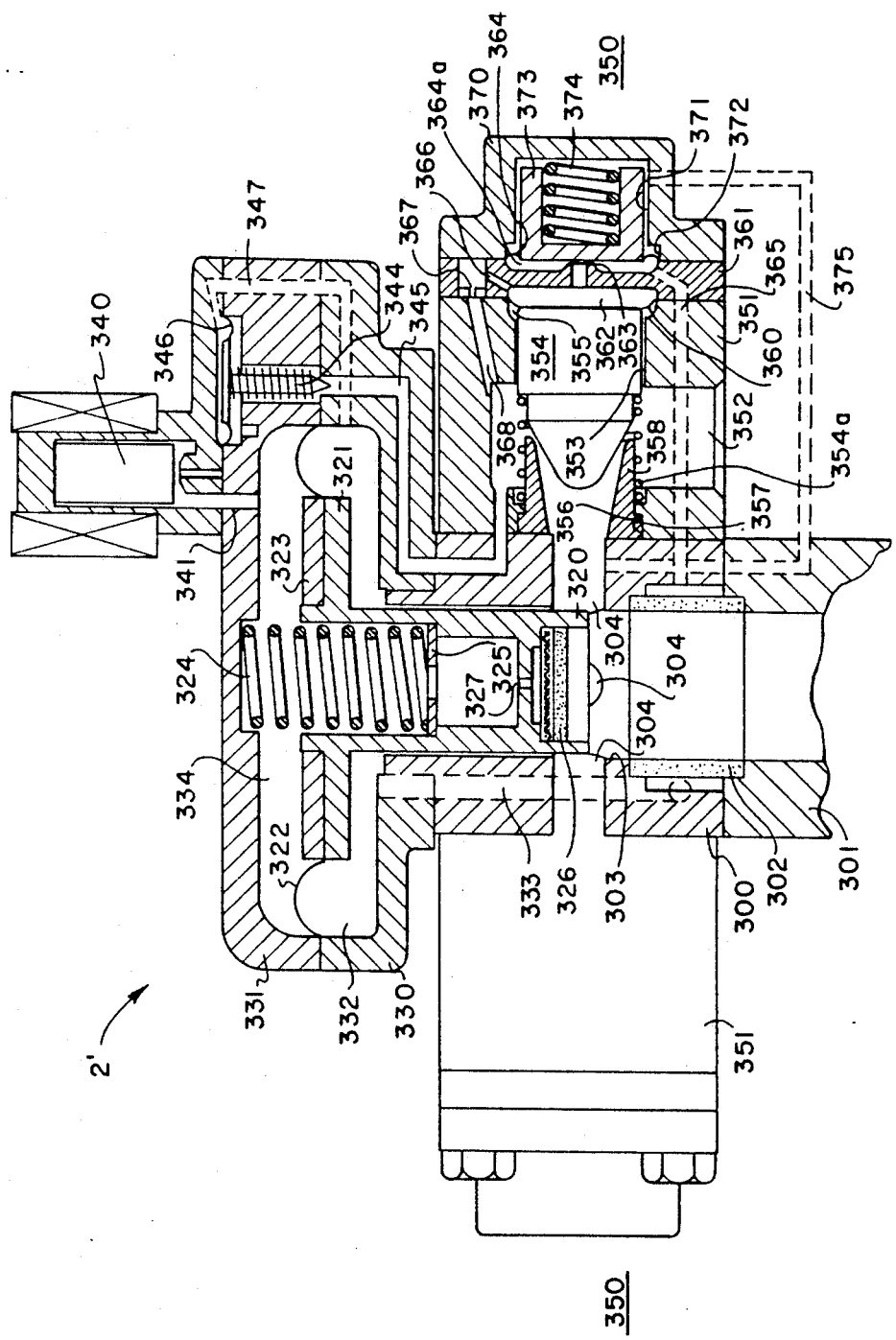
FIG. 7 is a partially broken away side view of second embodiment of a throttling device.

Second embodiment 2' of throttling device 2 is shown in FIG. 7. Throttling device 2' has a body 300 connected to an inlet 301. Retained between the body and inlet is a tubularshaped filter 302. Body 300 has a bore 303 that has four ports 304 whose center lines are perpendicular to the center line of bore 303, with the ports 304 having a common horizontal plane so that a piston 320 uncovers the ports equally for proper distribution. Body 300 is thus shown as having four sides, accommodating up to four base divisions. The description and illustration of a device having four divisions is by way of example only, and not a limitation, as the invention is useful with any number of ports.

Piston 320 has a flange 321 that has a diaphragm 322 clamped on its upper face by diaphragm disc 323. The upper end of the piston is counter-bored to receive closing spring 324. Washer magnet 325 is provided to accumulate iron oxide. The lower end of piston 320 is counter-bored to receive a filter 326. Restricting orifice 327 is located between the filter 326 and magnet 325.

Attached to the top end of body 300 is a lower diaphragm case 330, with the diaphragm 322 installed between the faces of the lower diaphragm case 330 and diaphragm bonnet 331. There are thus two chambers formed. The lower chamber 332 is the high pressure chamber and communicates with the inlet 301 across the filter 302 through passage 333. Passage 333 has ample capacity to accommodate the normal leakage between the body bore 303 and the outside of piston 320 without a pressure loss in chamber 332. Upper chamber 334 has communication with the inlet across filter 326, restricting orifice 327 and magnet 325. Chamber 334 has communication to the outlet 352 of one of the four pressure differential controls 350 across passage 341, across the duty cycle solenoid valve 340, across the pressure differential limiting valve 344, and through either passage 345 to the outlet bore 352 or through passage 345 to a waste outlet (not shown) that has communication with an applicator hose 23 (FIG. 1). The pressure limiting valve diaphragm 346 has communication with inlet 301 through passage 347, chamber 332 and passage 333. As in throttling device 2 described above, the pressure differential limiting valve 344 limits the operating pressure differential across the solenoid valve 340 that relates to the spring force over the diaphragm area.

Upon demand for product, the duty cycle solenoid valve 340 receives a square wave throttling signal generated by computer F. Computer F thus controls the position of piston 320 with respect to ports 304 by varying the off/on legs of the square wave signal, similar to the technique described for throttling device 2. Product flows across orifice 327. An equal flow across the solenoid would provide a fixed piston position, a greater flow across the solenoid would increase the port open areas, and a decrease of flow would decrease the port open areas.

Figure 7A:
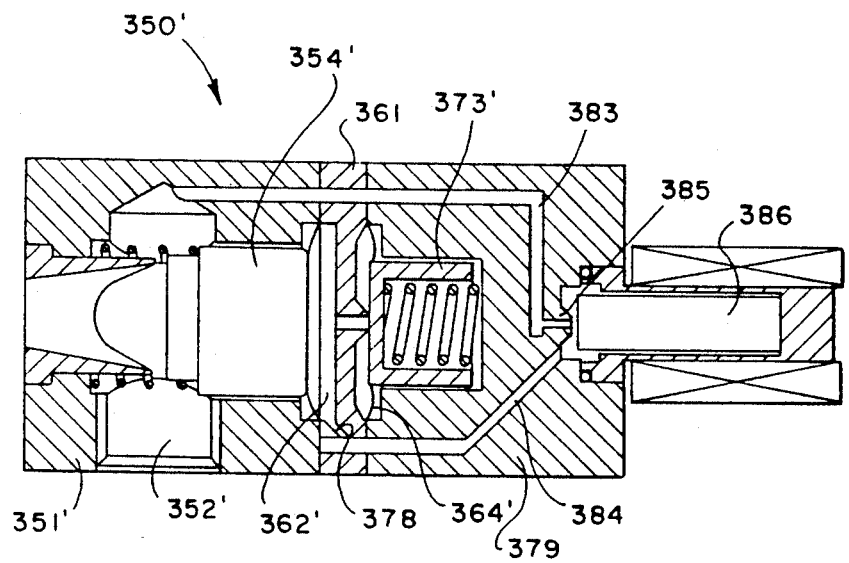
FIG. 7A is a partially broken away side view of a second embodiment of a pressure differential control.
Figure 8:
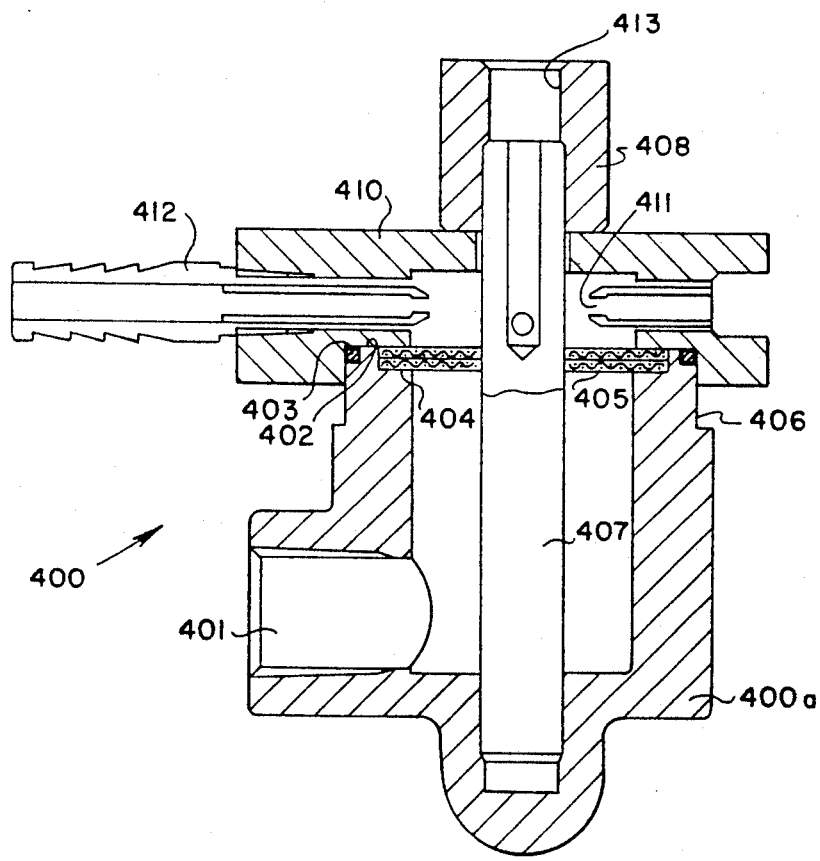
FIG. 8 is a partially broken away side view of a remote, tool bar-mounted manifold for use with the flow dividing and throttling device of FIG. 7.

The tool bar is divided into sections, with each section being fed by a different port 304 and having its own tool barmounted, remote manifold 400 shown in FIG. 8. A pressure differential control 350 throttles the product across each port 304 to provide the proper distribution of product to the different sections of the tool bar. When the embodiment of FIG. 7A is used, any number of these sections can be cut off to finish out a field, as long as computer F is informed so that it can provide the proper product flow rate to the open sections.

Figure 9:
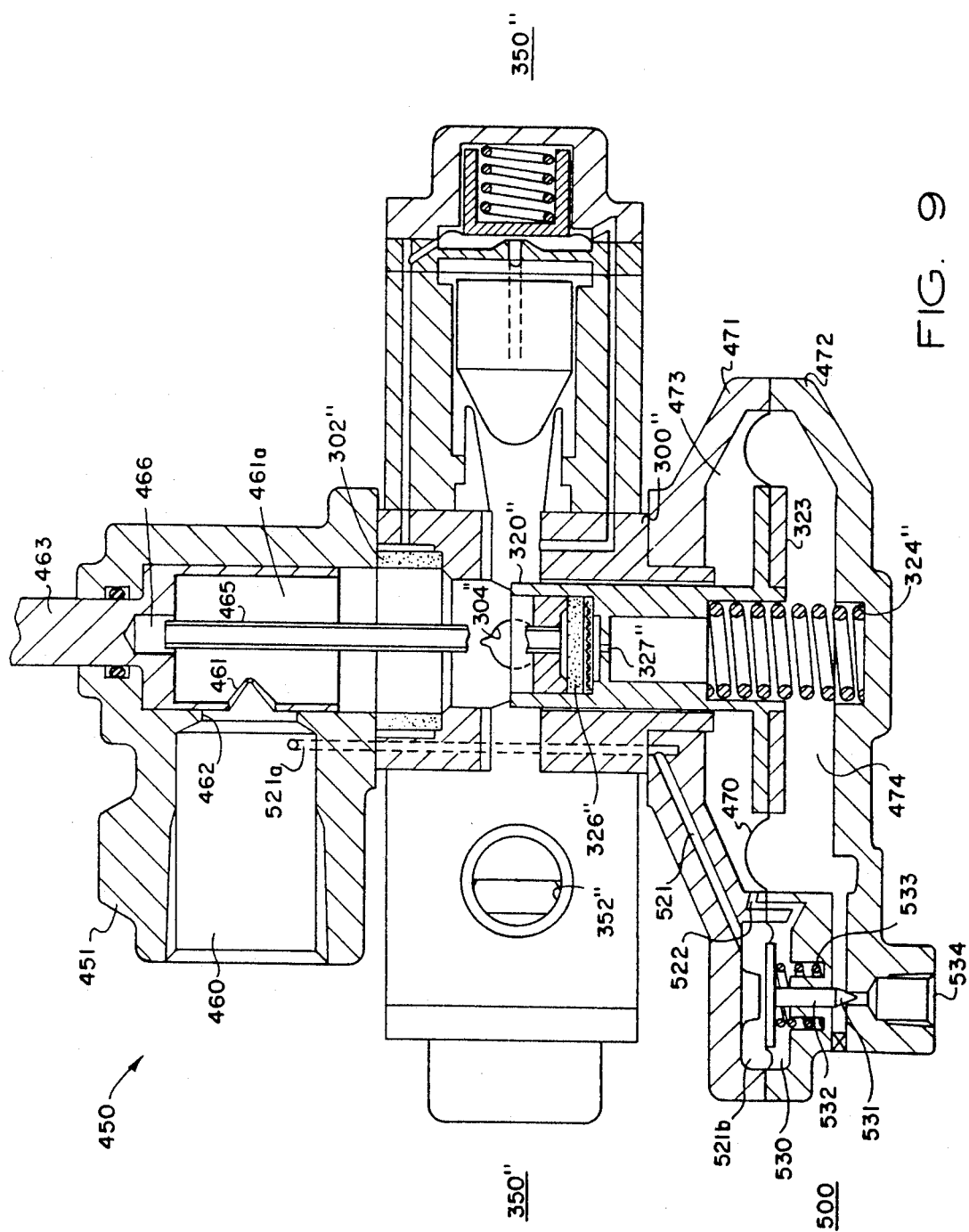
FIG. 9 is a partially broken away side view of a non-speed sensitive metering device having a flow dividing device.

Each differential control 350 has a body 351 having an outlet bore 352 connected by way of a conduit (not shown) to feed the remote manifold mounted 400 on the tool bar. Bore 352 is illustrated as pointing downwardly for clarity in FIG. 7 (and 7A), but preferably points horizontally as shown in FIG. 9. The body has a bore 353 that guides a throttling valve 354. Valve 354 is biased by spring 354a to the open position. On the outer end of bore 353 is a counter-bore 355 that provides a base for diaphragm 360 that allows the piston to move. The valve spring 354a aids in the assembly of the unit by maintaining the proper slack in diaphragm 360. There is a bore 356 and a counter-bore 357, having a common center line with bore 353, which locates and retains valve seat 358. A bonnet 370 has a bore 371 with a counter-bore 372. Bore 371 guides control piston 373 which contains control spring 374. The piston bore 371 has communication through passage 375 to read the pressure in the area between port 304 and the throttling valve 354. Between body 351 and bonnet 370 is a valve plate 361 that has a shallow cavity 362 with a seat 363 on the outer face. Diaphragms 360 and 364 are clamped on either side of control plate 361. The outer cavity 364a of plate 361 has communication with the inlet through passage 365 and filter 302. Cavity 362 has communication with the outlet 352 through passage 366, restricting orifice 367 and passage 368.

During operation, any pressure differences across the ports 304 are controlled with the positions of valve 354 by the flow of product through the control orifice 367 and across the valve 363 as controlled by the pressure difference across diaphragm 364. Less flow across valve 363 increases the throttle area across valve 354 and seat 358, while more flow decreases the area across valve 354 and seat 358.

Referring now to FIG. 7A, differential control 350' mounts to a square body 300 identical to the one shown in FIG. 7. Body 351' and the internal control parts are also identical to those shown in FIG. 7, with the exception being that the control plate 361' uses restricting orifice 378 in place of restricting orifice 367 of FIG. 7. The bonnet 370 (FIG. 7) is replaced with a solenoid valve body 379 (FIG. 7A) which houses control piston 373' and provides passage 383 and passage 384 for communication from chamber 362, to outlet bore 352" across the normally closed solenoid valve seat 385. When the solenoid plunger 386 is against its seat 385, ammonia can no longer flow to outlet bore 352,, and this equalizes the pressure in chamber 362' with the system's inlet pressure which brings valve 354, to its seat, shutting down this section of the system. The arrangement provides electrical means to selectively shut down tool bar sections to finish out a field or totally shut down the tool bar for turnaround at the row's end. When the circuit to the solenoid coil is closed, the plunger 386 is drawn off its seat 385, allowing the differential control 350' to function as previously described in connection with FIG. 7.

FIG. 8 illustrates the remote manifold 400 having an inlet body 400a with product inlet 401. Upper face 402 with sealing means 403 has counter-bore 404 to receive screen bed 405 and a machined section 406 so arranged to receive manifold ring 410. Manifold ring 410 is machined to provide the number of outlets required by each section of the tool bar, and the outside diameter of the ring is sized to allow the orificed ends 411 or equivalent hose connections 412 form as small a ring as practical. The manifold ring 410 is attached to the body with a vertical post 407 extending through the ring and secured by a nut 408 which has boss 413 to mount a pressure gauge in its top.

Manually-Adjustable Metering Device

FIG. 9 illustrates manually-adjusted metering device 450 having a metering barrel body 451 with an inlet 460.

Device 450 uses a V-shaped opening 461 in a barrel 461a for adjusting the product flow rate. Product is metered by varying the open area between V-slot 461 and the edges of a round opening 462 (See U.S. Pat. No. 3,173,448, Mar. 16, 1965, James S. Jones, the disclosure of which is incorporated herein by reference).

Device 450 uses a common throttling piston 320"the divider body 300"and the pressure differential controls 350"similar to those shown in FIG. 7. However, in FIG. 9 the body 300"and the pressure differential controls 350"are inverted from those of FIG. 7, so that a meter dial (not shown) attached to stem 463 of barrel 461a, can be easily set. In addition, FIG. 9 shows the outlet bores 352" arranged to expel fluid horizontally, which is the preferred orientation.

A small pick-up tube 465 extends vertically from piston 20" and extends into a drilled opening 466 in barrel 461a and picks up product which is predominantly vapor and is used to position throttling piston 320'. The removal of vapor from the system just prior to dividing the product enhances the ability of the device to equally divide the flow at lower demands.

The throttling piston 320" is positioned by the pressure difference across diaphragm 470 and spring 324'. Diaphragm 470 is clamped between the faces of the upper case 471 and the lower case 72 forming an upper diaphragm chamber 473 which has communication with the area just downstream from the metering barrel 461a across filter 302" though a passage not shown in FIG. 9, but shown as 333 in FIG. 7. Lower diaphragm chamber 474 has communication with the area downstream of metering barrel 461a through tube 465, across filter 326", and across orifice 327".

The position of piston 320" is controlled by a pressure difference device 500 which reads the pressure difference across the metering port 461, with the upstream pressure read through passages 521 and 521a to chamber 521b formed by upper case 471 and a portion of diaphragm 470, and with the downstream communication provided through filter 302" through passage 333 (shown in FIG. 7) into chamber 473 across passage 522 (in upper and lower cases 471 and 472, respectively) into chamber 530 formed by lower case 472 and diaphragm 470. A normally open valve 531 having a stem 532 has limited clearance with its guide in lower case 472. Valve 531 is loaded by control spring 533, which places a pressure differential across that portion of diaphragm 470 that separates chambers 520 and 530. This pressure differential relates to the spring force divided by the effective diaphragm area. This in turn will be the pressure difference across the metering port. See U.S. Pat. No. 4,364,409, James S. Jones, the disclosure of which is incorporated herein by reference, which shows a similar device, except the throttle is normally open with the control normally closed, while device 450 has the throttle normally closed with the control normally open.

In operation, the system's shut-off valve is preferably a ball valve upstream of device 450. With the shut-off valve closed, the pressure in device 450 will be ambient. There could be some liquid at −28 degrees Fahrenheit within the device. Upon demand for product, the shut-off valve is opened, and as the product enters the device with piston 320" normally closed and valve 531 normally open, a sudden rise in pressure will arrive in chamber 473 across passage 333 (FIG. 8) prior to a pressure rise in chamber 474 across orifice 327", causing piston 320" to move downward. The downward movement of piston 320" opens the throttle ports 304"', allowing product to move through the device and causing a pressure difference across the metering barrel 461a. The pressure difference is read across the diaphragm-separating chambers 521b and 530, such that valve 531 throttles the product leaving chamber 474 before entering waste outlet 534.

Thus, the control valve 500 positions piston 320 to maintain a constant pressure difference across the metering barrel 461a, thus providing a constant quantity. Meanwhile, the controls 350 maintain the proper pressure differences across the dividing ports to provide the proper distribution to the different sections of the tool bar.

Whereas, the present invention has been described with the respect to specific embodiments thereof, it will be understood that various changes and modifications will be suggested to one skilled in the art and it is intended to encompass such changes and modifications as fall within the scope of the appended claims.

I claim:

1. A system for controlling the flow of agricultural ammonia from a pressure tank having an outlet to applicator apparatus transported by a land vehicle over the ground, where ammonia is moved through the system by its own vapor pressure, comprising:
 a ground speed sensor that generates a speed signal representing the speed of the land vehicle over the ground;
 an ammonia flow reader located substantially immediately downstream of the outlet of the tank that generates a flow rate signal representing the flow of ammonia through the system;
 a throttling device located substantially immediately upstream of at least one distribution manifold and having means for varying the flow of ammonia through the system; and
 computing means for sending a throttling signal to the throttling device, the computing means being responsive to the speed signal and flow rate signal to cause the throttling device to throttle the flow of ammonia through the system.

2. The system of claim 1 where the computing means varies the throttling signal to maintain a direct relationship between ammonia flow and ground speed, such that ammonia is applied to the ground at a constant predetermined rate.

3. The system of claim 1 wherein the ground speed signal, the flow rate signal and throttling signal are electrical.

4. The system of claim 1, with the ammonia flow reader comprising:
 flow restriction means in the conduit for inducing a pressure differential in the conduit;
 the flow restriction means being variable in area;
 variation means for causing the area of the flow restriction means to vary in response to changes in the pressure differential, such that a constant pressure difference is maintained across the flow restriction means; and
 means for generating the flow rate signal responsive to the variation means, such that the flow rate signal is proportional to the area of the flow restriction means required to maintain the constant pressure differential.

5. The system of claim 4 where the flow restriction means is an unbalanced butterfly disc mounted to a freely rotatable shaft.

6. The system of claim 4 where the variation means includes a spring-loaded main diaphragm operatively connected to the flow restriction means, such that the position of the main diaphragm within a chamber determines the area of the flow restriction means.

7. The flow reader of claim 6 wherein the position of the main diaphragm is established by a difference in pressures in the chamber on opposite sides of the main diaphragm, and the difference in pressures is controlled by control means for sensing the pressure differential across the flow restriction means to maintain a constant pressure differential.

8. The flow reader of claim 7 where the control means is a control valve operated by a spring-loaded control diaphragm in a chamber, with a first side of the chamber in communication with the conduit upstream of the flow restriction means, and a second side of the chamber being in communication with conduit downstream of the flow restriction means.

9. The system of claim 1, with the throttling device comprising:
 a body having an inlet and at least one outlet, with a main valve disposed to throttle flow therebetween;
 the main valve being mounted on a diaphragm and being spring-loaded to a closed position;
 a first side of said diaphragm being in communication with the inlet;
 a second side of said diaphragm being in communication with the inlet by way of a restricting orifice and being in communication with the outlet through control means for controlling flow through the restricting orifice and from the second side of the diaphragm to the outlet; and
 the control means being responsive to the throttling signal, such that the main valve is positioned by controlling the flow through the control means from the second said of the diaphragm to the outlet.

10. The throttling device of claim 9 wherein the control means includes a solenoid valve, and the throttling signal is a square wave applied to the solenoid valve.

11. The throttling device of claim 9 further including means for limiting the pressure differential across the control means.

12. The throttling device of claim 9 having a plurality of outlets, with means for equalizing the pressure differentials across the outlets.

13. The throttling device of claim 12 with means for shutting off one of the plurality of outlets.

14. The throttling device of claim 12 in combination with a remote manifold connected to each of the throttling device outlets, each remote manifold having a plurality of manifold outlets to divide the flow of fluid.

* * * * *